Jan. 19, 1926.
J. S. STURM
1,570,189
ADJUSTABLE SHOVEL
Filed Dec. 17, 1924
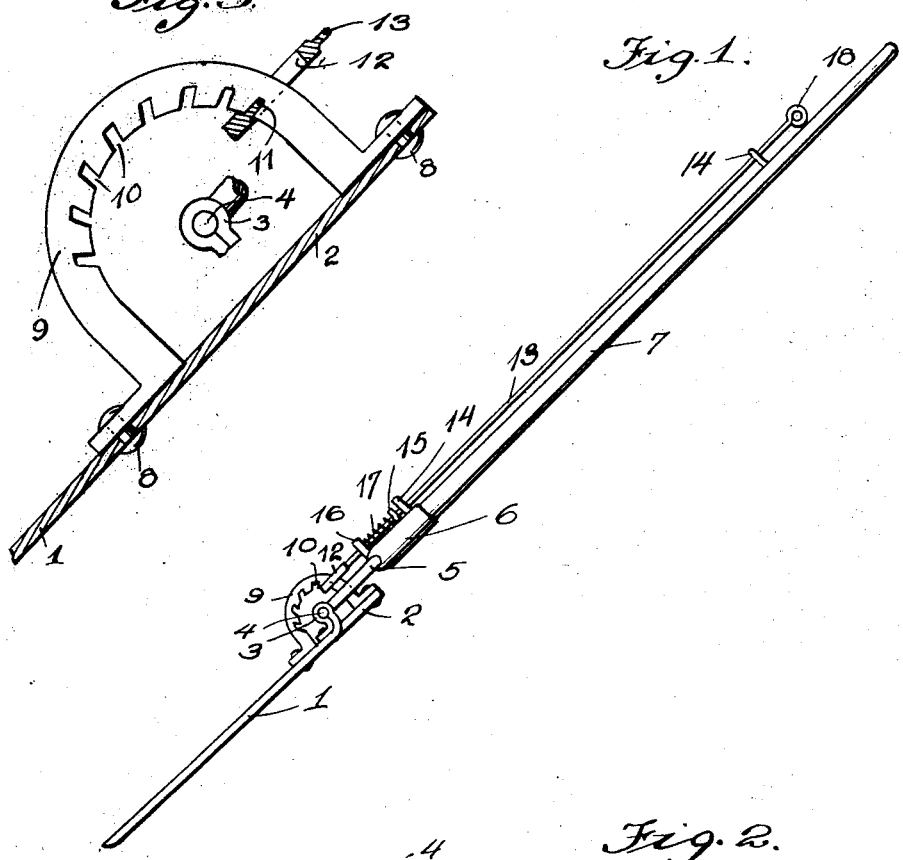
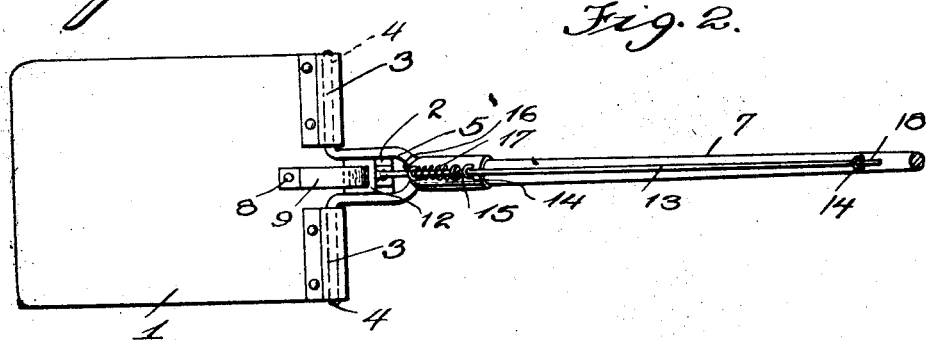
Inventor
J. S. Sturm
Attorney

Patented Jan. 19, 1926.

1,570,189

UNITED STATES PATENT OFFICE.

JOHN SIMON STURM, OF HAYTI, MISSOURI.

ADJUSTABLE SHOVEL.

Application filed December 17, 1924. Serial No. 756,579.

*To all whom it may concern:*

Be it known that I, JOHN SIMON STURM, a citizen of the United States, residing at Hayti, in the county of Pemiscot, State of Missouri, have invented a new and useful Adjustable Shovel; and I do hereby declare the following to be a full, clear, and exact description of the invention, such as will enable others skilled in the art to which it appertains to make and use the same.

The invention relates to shovels, and has for its object to provide a device of this character wherein the blade may be positioned and held at various angles to the handle, thereby allowing the shovel to be adjusted for various uses, for instance as a hoe, a scoop in digging fence holes or straightened in relation to the handle for use as a spade or shovel.

A further object is to provide an adjustable shovel comprising a handle member, one end of which terminates in a U-shaped member having outwardly extending arms rotatably mounted in rolls carried by the rear end of the blade of the shovel and a toothed segment carried by the shovel between the rolls and on an integral extension carried by the blade, and with which toothed segment a dog cooperates for holding the blade at various angles.

A further object is to provide the handle member with a slidable rod to which the segment dog is connected and spring means for normally forcing said dog into cooperative engagement with the toothed segment.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the adjustable shovel.

Figure 2 is a top plan view of the shovel.

Figure 3 is an enlarged side elevation of the segment showing the dog which cooperates therewith.

Referring to the drawing, the numeral 1 designates the blade of the shovel, the inner end of which is provided with a rearwardly extending member 2, in the plane of the blade formed by splitting the rear end of the blade longitudinally at spaced points and by rolls 3 at opposite sides of the blades formed integral therewith. The rolls 3 are upwardly offset from the blade 1 and have pivotally mounted therein alined oppositely extending arms 4 of the U-shaped member 5, which is formed integral with the sleeve 6 secured to the inner end of the handle member 7. It will be seen that the blade 1 may be moved pivotally in the plane of the handle for varying the angle of the blade to the handle as desired, thereby allowing the device to be easily and quickly converted into a hoe, or the angle of the blade to be varied for other purposes, for instance cleaning out post holes, or for using the same as a cultivator hoe or weed cutter.

Secured to the blade 1 adjacent its rear end and the extension 2 by means of rivets 8 is a segment 9 having its inner side provided with a plurality of spaced notches 10, with which the tooth 11 of the yoke 12 cooperates for holding the blade 1 in various angular adjusted position. The yoke 12 extends around the segment 9, and is carried by rearwardly extending shaft 13, which is slidably mounted in spaced brackets 14 carried by the handle member 7, and by means of which rod 13, the yoke 12 may be moved forwardly or rearwardly for disengaging the blade, and allowing said blade to be adjusted to a desired angle, and locking the blade in position after an adjustment thereof. Surrounding the rod 13 and interposed between a collar 15 carried thereby and a lug 16 carried by the handle member 7 is a coiled spring 17, which coiled spring normally forces the rod 13 rearwardly, and holds the tooth 11 in one of the recesses 10. The rear end of the rod 13 is provided with a finger engaging loop 18, adapted to be grasped by the operator for moving the rod 13 longitudinally for controlling the yoke 12 during a locking or unlocking device.

From the above it will be seen that an adjustable shovel is provided wherein the blade may be easily and quickly adjusted at various angles to the handle, positively held in position, and the device used for various things, for instance a hoe, weed cutter, spade or shovel.

The invention having been set forth what is claimed as new and useful is:—

An adjustable shovel comprising a handle member, said handle member at its lower end terminating in a U-shaped member pivoted to opposite sides of a blade, a rearwardly extending member carried by the blade below the U-shaped member and the arms thereof, a segment carried by the blade and disposed between the U-shaped member of the handle and having its rear end secured to the rearwardly extending member, internal recesses carried by the inner side of the segment, a toothed yoke surrounding the segment and through which the segment moves and cooperating with the recesses in the inner side of the segment, a rod slidably mounted on the handle member and connected to the yoke and spring means cooperating with said rod and forcing the same rearwardly and forming means for normally maintaining the toothed yoke in operative position.

In testimony whereof I have signed my name to this specification.

JOHN SIMON STURM.